(12) United States Patent
Kisley et al.

(10) Patent No.: US 10,298,390 B2
(45) Date of Patent: *May 21, 2019

(54) INTEGRITY PROTECTED TRUSTED PUBLIC KEY TOKEN WITH PERFORMANCE ENHANCEMENTS

(71) Applicant: International Business Machines Corporation, Armonk, NY (US)

(72) Inventors: Richard V. Kisley, Charlotte, NC (US); Michael J. Miele, Concord, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/805,511

(22) Filed: Nov. 7, 2017

(65) Prior Publication Data

US 2018/0091299 A1    Mar. 29, 2018

Related U.S. Application Data

(63) Continuation of application No. 15/278,975, filed on Sep. 28, 2016, now Pat. No. 9,838,203.

(51) Int. Cl.
*H04L 29/06* (2006.01)
*H04L 9/08* (2006.01)
(Continued)

(52) U.S. Cl.
CPC ............ *H04L 9/0861* (2013.01); *G06F 21/00* (2013.01); *G06F 21/335* (2013.01); *H04L 9/14* (2013.01); *H04L 9/3066* (2013.01); *H04L 9/3242* (2013.01); *H04L 9/3249* (2013.01); *H04L 9/3263* (2013.01); *H04L 9/3268* (2013.01); *G06F 2221/2107* (2013.01); *G06F 2221/2141* (2013.01)

(58) Field of Classification Search
USPC ........................................................ 714/807
See application file for complete search history.

(56) References Cited

U.S. PATENT DOCUMENTS 5,200,999 A * 4/1993 Matyas ............... G06F 9/30018
380/277
6,694,025 B1 * 2/2004 Epstein ................... H04L 9/083
380/277

(Continued)

OTHER PUBLICATIONS

Kisley et al., "Integrity Protected Trusted Public Key Token With Performance Enhancements," U.S. Appl. No. 15/278,975, filed Sep. 28, 2016.

(Continued)

*Primary Examiner* — Maung T Lwin
(74) *Attorney, Agent, or Firm* — Cantor Colburn LLP; Teddi Maranzano (57) ABSTRACT

Embodiments are directed to a computer-implemented method, computer system, and computer program product for creating a public key token. A public key and private key are generated, using a master key. A set of permissions is received for the public key and private key that note the allowable uses for the public key and private key. Thereafter, the set of permissions, encrypted public key, and other associated information is placed in a public key token.

15 Claims, 4 Drawing Sheets

(51) Int. Cl.
*H04L 9/14* (2006.01)
*H04L 9/32* (2006.01)
*H04L 9/30* (2006.01)
*G06F 21/00* (2013.01)
*G06F 21/33* (2013.01)

(56) References Cited

U.S. PATENT DOCUMENTS

| | | | | |
|---|---|---|---|---|
| 7,194,620 | B1* | 3/2007 | Hayes | H04L 9/3247 380/280 |
| 8,412,927 | B2* | 4/2013 | Kwan | H04L 9/083 380/278 |
| 8,555,361 | B2* | 10/2013 | Nakhjiri | H04L 63/061 380/247 |
| 2003/0046238 | A1* | 3/2003 | Nonaka | G06F 21/10 705/51 |
| 2010/0031021 | A1* | 2/2010 | Arnold | H04L 9/0637 713/155 |
| 2010/0250956 | A1* | 9/2010 | Reed | G06F 21/6218 713/185 |
| 2013/0039495 | A1* | 2/2013 | Arnold | H04L 9/0897 380/277 |
| 2014/0108782 | A1* | 4/2014 | Salinger | G06F 21/10 713/155 |
| 2016/0036793 | A1* | 2/2016 | Su | H04L 9/0825 713/171 |

OTHER PUBLICATIONS

List of IBM Patents or Patent Applications Treated as Related; Date Filed: Nov. 8, 2017, 2 pages.

\* cited by examiner

INTEGRITY PROTECTED TRUSTED PUBLIC KEY TOKEN WITH PERFORMANCE ENHANCEMENTS

CROSS-REFERENCE TO RELATED APPLICATION

This application is a continuation of U.S. application Ser. No. 15/278,975, filed Sep. 28, 2016, the contents of which are hereby incorporated by reference in its entirety.

BACKGROUND

The embodiments described herein relate in general to the field of encryption. More specifically, the embodiments described herein relate to cryptographic data structures to protect public keys.

Various methods exist in support of electronic data security. Cryptography is the transformation of intelligible information into an apparently unintelligible form in order to conceal the information from unauthorized parties. Cryptography is used for various purposes, such as to protect information transmitted through communications networks or stored on data storage units. Cryptographic procedures can be used not only to protect the privacy of data but also the integrity of data. The cryptographic transformation of data is ordinarily defined by a selected algorithm, or procedure, under the control of a key. Since the algorithm is normally public knowledge, protection of the transformed, or enciphered, data depends on the secrecy of the key. Thus, the key must be kept secret to prevent an opponent from using the known algorithm and key to recover the protected data. The protection of the data, therefore, hinges on the protection of secret keys.

SUMMARY

Embodiments are directed to a computer-implemented method for creating a public key token. The method includes generating a public key and a private key associated with the public key. Thereafter, a set of permissions for the public key and the private key is received. Then, the public key and the set of permissions is placed in the public key token. The public key token can be a Common Cryptographic Architecture (CCA) key token.

Embodiments are further directed to a computer system for creating a public key token. The system includes a memory and a processor system communicatively coupled to the memory. The processor is configured to perform a method that includes generating a public key and a private key associated with the public key. Thereafter, a set of permissions for the public key and the private key is received. Then, the encrypted public key and the set of permissions is placed in the public key token. The public key token can be a Common Cryptographic Architecture (CCA) key token. The public key and the private key were generated using a master key.

Embodiments are further directed to a computer program product for creating a public key token. The computer program product includes a computer-readable storage medium having program instructions embodied therewith, wherein the computer-readable storage medium is not a transitory signal per se. The program instructions are readable by a processor system to cause the processor system to perform a method that includes generating a public key and a private key associated with the public key. Thereafter, a set of permissions for the public key and the private key is received. Then, the encrypted public key and the set of permissions is placed in the public key token. The public key token can be a Common Cryptographic Architecture (CCA) key token. The public key and the private key were generated using a master key.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

In the accompanying figures and following detailed description of the disclosed embodiments, the various elements illustrated in the figures are provided with three digit reference numbers.

DETAILED DESCRIPTION

Various embodiments of the present invention will now be described with reference to the related drawings. Alternate embodiments can be devised without departing from the scope of this invention. Various connections might be set forth between elements in the following description and in the drawings. These connections, unless specified otherwise, can be direct or indirect, and the present description is not intended to be limiting in this respect. Accordingly, a coupling of entities can refer to either a direct or an indirect connection.

Additionally, although a detailed description of a computing device is presented, configuration and implementation of the teachings recited herein are not limited to a particular type or configuration of computing device(s). Rather, embodiments are capable of being implemented in conjunction with any other type or configuration of wireless or non-wireless computing devices and/or computing environments, now known or later developed.

Furthermore, although a detailed description of algorithms is included herein, implementation of the teachings recited herein are not limited to embodiments described herein. Rather, embodiments are capable of being implemented in conjunction with any other type of system, now known or later developed.

At least the features and combinations of features described in the immediately present application, including the corresponding features and combinations of features depicted in the figures amount to significantly more than implementing a method and data structure for protecting a public key using a public key token. Additionally, at least the features and combinations of features described in the immediately preceding paragraphs, including the corresponding features and combinations of features depicted in the figures go beyond what is well-understood, routine and conventional in the relevant field(s).

Cryptography is the transformation of intelligible information into an apparently unintelligible form in order to conceal the information from unauthorized parties. A common form of cryptography is public-key cryptography, also known as asymmetric cryptography. Public-key cryptography uses a pair of keys, a public key, and a private key. Exemplary forms of public-key cryptography include RSA cryptography and elliptic curve cryptography (EC or ECC).

In common usage, a first user (Alice) has both a public key, that is publicly known and available and a related private key, which is known only to Alice and was created at the same time as the public key. If another user (Bob), wishes to send a secure message to Alice, he encrypts the message using Alice's public key. The message is encrypted and only can be decrypted by Alice or someone who has Alice's private key. Asymmetric cryptography solves certain problems of symmetric cryptography, such as the fact that a symmetric key has to be in the possession of both the sender and receiver in order to work properly. The problem with that situation is that the public key must be distributed to both Alice and Bob in order to maintain security.

A public/private key pair also can be used to sign messages, in order to prove that the message actually was sent by the sender. In such a case, Alice would sign a message using her private key. Anyone who receives the message can use Alice's public key to verify her signature to confirm it was sent by Alice.

Cryptography is of such importance that there has been a growth in the use of hardware security modules (HSM), physical computing devices that safeguard and manage digital keys for authentication purposes and to provide processing for cryptography functions. Some HSM operate using Common Cryptographic Architecture (CCA), an application programming interface (API) that allows one to obtain services from, and to manage the operation of, a cryptographic system that meets CCA specifications.

In certain systems, while there can be provisions to keep the private key secret if it leaves the HSM, there may not be provisions to ensure the integrity of the public key if it leaves the HSM. For increased security, it is desirable to have, for each public key, a public key token that protects and confirms the integrity of the public key and has a binding to the permissions of the public key.

As discussed above, a key is a string of data that is used to decrypt or encrypt data. Keys are generally encrypted when the keys are outside of a protected environment (an HSM being an exemplary protected environment). Encrypted keys are generally carried in a protected data structure called a key token or a key block. The new key token is generated on the local node at the same time as the generation of the public and private key pair is generated. A master key that belongs to the node can be used to encrypt the private portion of the public and private key pair. A derivative key (such as one generated using a key derivation function) would be used to calculate a message authentication code (MAC) over the entire public key token, thus ensuring the integrity of the key token.

The new key token can be created on the local node from an existing public-private key pair token. This method validates that the private part of the key token pair is encrypted under an active node master key and that the private key attributes and security are consistent with the requirements of the new token creation process. The new token is populated with the public key components of the RSA or ECC key, then the MAC is calculated over the entire token, ensuring integrity of the key token.

The new key token also could be created from an existing X.509 certificate. This method would validate the signature of the X.509 token when presented and maintain the key usage restrictions therein. The new token would then have the MAC created by a derivative of the master key on the importing node.

X.509 is a standard that is used to manage digital certificates and public-key encryption. It is most famously used for secure websites using hypertext transfer protocol secure (https), where X.509 certificates are used to authenticate the server. However, X.509 certificates are expensive to use due to the signature verification.

Figure 1:
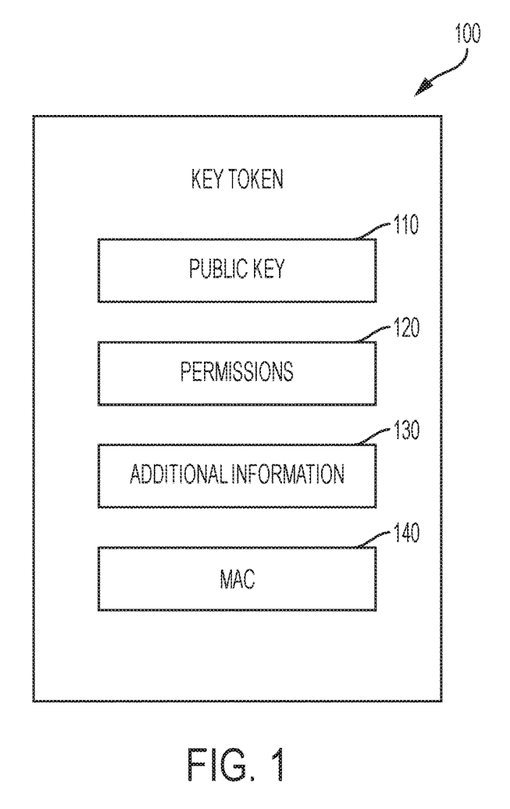
FIG. 1 depicts a block diagram of an exemplary key token.

FIG. 1 is a block diagram illustrating the layout of an exemplary key token according to an embodiment. Key token 100 is used to protect public key 110. In some embodiments, public key 110 was created using elliptic curve (EC, also known as elliptic curve cryptography (ECC)) techniques for the creation of public key 110 and its associated private key (not illustrated). In some embodiments, public key 110 was created using RSA techniques. Other portions of key token 100 can be used to describe the purpose of public key 110. There can be a permissions field 120 that contains permissions for the public key. In some embodiments, permissions field 120 can indicate which tasks for which public key 110 can be used. Additional information 130 can also be present that holds additional attributes and information regarding the public key in key token 100. The additional information can include, for example, an identifying label. There can be a message authentication code (MAC) field 140 that is used to store the MAC for the public key. The MAC is used to authenticate that the purported creator of the public key is the actual creator of the public key and to ensure that the contents of the token, especially the permissions, have not been changed.

Figure 2:
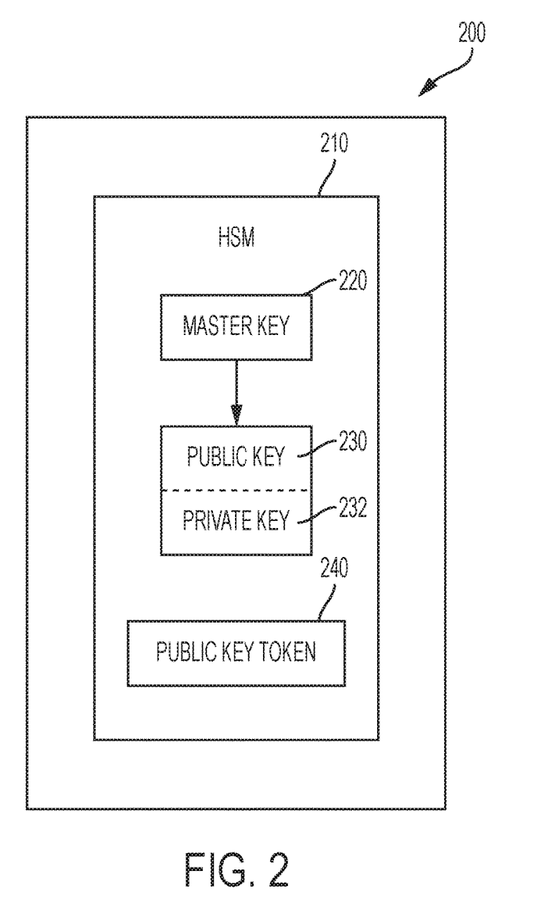
FIG. 2 depicts an exemplary system in which an embodiment can operate.

FIG. 2 shows an exemplary system 200 that can be used to create key token 100. System 200 includes HSM 210. HSM 210 has a hierarchy of keys including a master key 220 that can be used to encrypt other keys. HSM 210 creates a public key 230 and associated private key 232, using RSA or ECC primitives and using master key 220 to encrypt the private part of the public/private key pair. HSM 210 also creates a public key token 240 (which has a format similar to that of key token 100). Public key token 240 contains public key 230 in a secure format that also can be used to determine the allowed usage or permissions of public key 230 (in some circumstances it is desirable to have a public key that can only be used to perform certain tasks, as set forth below.)

Table 1 shows the layout of an exemplary key token according to an embodiment. It should be understood that the layout detailed below is merely exemplary and other key token layouts are possible. The purpose of each field will now be described in further detail. After a header, there is a field that indicates the manner in which the public key was generated. There can be a value that indicates that the key was generated using RSA techniques. There can be a value that indicates that the key was generated using EC techniques. Other values can be added as additional key generation techniques are added. There can be a field for the master key verification pattern (MKVP). The MKVP allows the HSM to determine if the token was created using an available master key. Additional fields can indicate that type of algorithm used for the MAC. Another field can contain a bit-field mapping field. This field indicates the permissions for key usage for the key token. This can be the purpose of the key contained in the key token. The usage restriction can be employed when a key that could be used for more than one operation is to be restricted. For example, if a key should be used only for key management, bit position 2 would be asserted. In some embodiments, a 1 in a certain bit position means indicates that the usage is permitted for a particular task. A zero in that position means the usage is not permitted for that task. There can be reserved bits that can be used in future embodiments as more available tasks are added to embodiments.

In some embodiments, the bit positions can be similar to the usage in an X.509 certificate, and is illustrated in Table 2. The digital signature bit is asserted when the subject public key is used for verifying digital signatures, other than signatures on certificates (bit 5) and CRLs (bit 6), such as those used in an entity authentication service, a data origin authentication service, and/or an integrity service. The non-repudiation bit is asserted when the subject public key is used to verify digital signatures, other than signatures on certificates (bit 5) and CRLs (bit 6), used to provide a non-repudiation service that protects against the signing entity falsely denying some action. In the case of later conflict, a reliable third party may determine the authenticity of the signed data. The key encipherment bit is asserted when the subject public key is used for enciphering private or secret keys, i.e., for key transport. For example, this bit shall be set when an RSA public key is to be used for encrypting a symmetric content-decryption key or an asymmetric private key. The data encipherment bit is asserted when the subject public key is used for directly enciphering raw user data without the use of an intermediate symmetric cipher. Note that the use of this bit is extremely uncommon; almost all applications use key transport or key agreement to establish a symmetric key.

In some embodiments, there is also an extended key usage field. In some embodiments, the bit positions can be similar to the usage in X.509 certificate, as illustrated in Table 3.

There can be an identifier label that can be used to provide a name for the public key token. Thereafter, there is information about the public key. This can include the public key and various information about the public key (such as the length, bit length, and the like). Thereafter, there is a field that contains padding to ensure that the public key section is of the correct length. In some embodiments, the public key section is a multiple of 16 bytes. The padding is used to ensure that length is achieved. Finally, there is a field for the MAC. As stated above, the MAC is used to ensure that the key token has integrity (has not been altered). In some embodiments, a key derivation function can be used to create a derivative key from a master key. Thereafter, the derivative key is used to calculate that MAC over the entire token.

Figure 3:
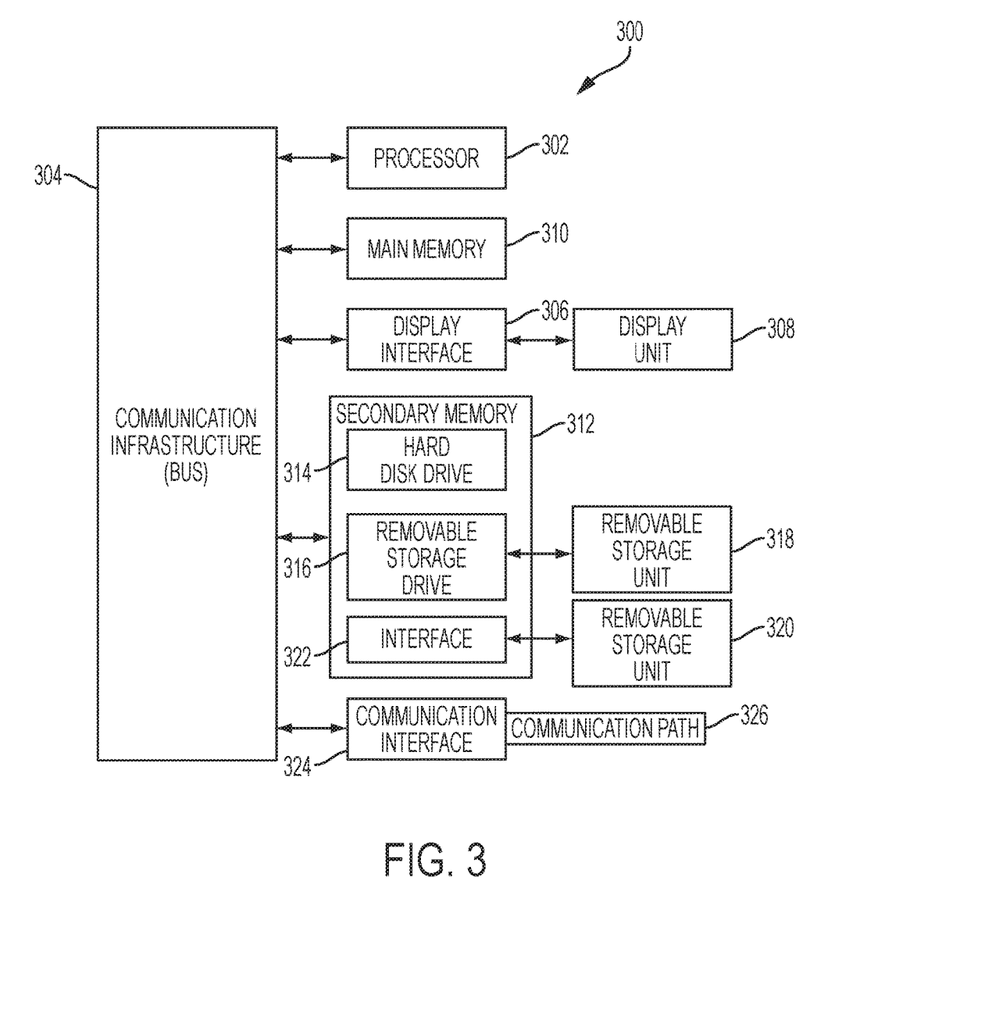
FIG. 3 depicts a computer system capable of implementing hardware components of one or more embodiments.

FIG. 3 depicts a high-level block diagram of a computer system 500, which can be used to implement one or more embodiments. More specifically, computer system 500 can be used to implement hardware components of systems capable of performing methods described herein. Although one exemplary computer system 500 is shown, computer system 500 includes a communication path 526, which connects computer system 500 to additional systems (not depicted) and can include one or more wide area networks (WANs) and/or local area networks (LANs) such as the Internet, intranet(s), and/or wireless communication network(s). Computer system 500 and additional system are in communication via communication path 526, e.g., to communicate data between them.

Computer system 500 includes one or more processors, such as processor 502. Processor 502 is connected to a communication infrastructure 504 (e.g., a communications bus, crossover bar, or network). Computer system 500 can include a display interface 506 that forwards graphics, textual content, and other data from communication infrastructure 504 (or from a frame buffer not shown) for display on a display unit 508. Computer system 500 also includes a main memory 510, preferably random access memory (RAM), and can also include a secondary memory 512. Secondary memory 512 can include, for example, a hard disk drive 514 and/or a removable storage drive 516, representing, for example, a floppy disk drive, a magnetic tape drive, or an optical disc drive. Hard disk drive 514 can be in the form of a solid-state drive (SSD), a traditional magnetic disk drive, or a hybrid of the two. There also can be more than one hard disk drive 514 contained within secondary memory 512. Removable storage drive 516 reads from and/or writes to a removable storage unit 518 in a manner well known to those having ordinary skill in the art. Removable storage unit 518 represents, for example, a floppy disk, a compact disc, a magnetic tape, or an optical disc, etc. which is read by and written to by removable storage drive 516. As will be appreciated, removable storage unit 518 includes a computer-readable medium having stored therein computer software and/or data.

In alternative embodiments, secondary memory 512 can include other similar means for allowing computer programs or other instructions to be loaded into the computer system. Such means can include, for example, a removable storage unit 520 and an interface 522. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 520 and interfaces 522 which allow software and data to be transferred from the removable storage unit 520 to computer system 500.

Computer system 500 can also include a communications interface 524. Communications interface 524 allows software and data to be transferred between the computer system and external devices. Examples of communications interface 524 can include a modem, a network interface (such as an Ethernet card), a communications port, or a PC card slot and card, a universal serial bus port (USB), and the like. Software and data transferred via communications interface 524 are in the form of signals that can be, for example, electronic, electromagnetic, optical, or other signals capable of being received by communications interface 524. These signals are provided to communications interface 524 via a communication path (i.e., channel) 526. Communication path 526 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 510 and secondary memory 512, removable storage drive 516, and a hard disk installed in hard disk drive 514. Computer programs (also called computer control logic) are stored in main memory 510 and/or secondary memory 512. Computer programs also can be received via communications interface 524. Such computer programs, when run, enable the computer system to perform the features discussed herein. In particular, the computer programs, when run, enable processor 502 to perform the features of the computer system. Accordingly, such computer programs represent controllers of the computer system. Thus it can be seen from the forgoing detailed description that one or more embodiments provide technical benefits and advantages.

Figure 4:
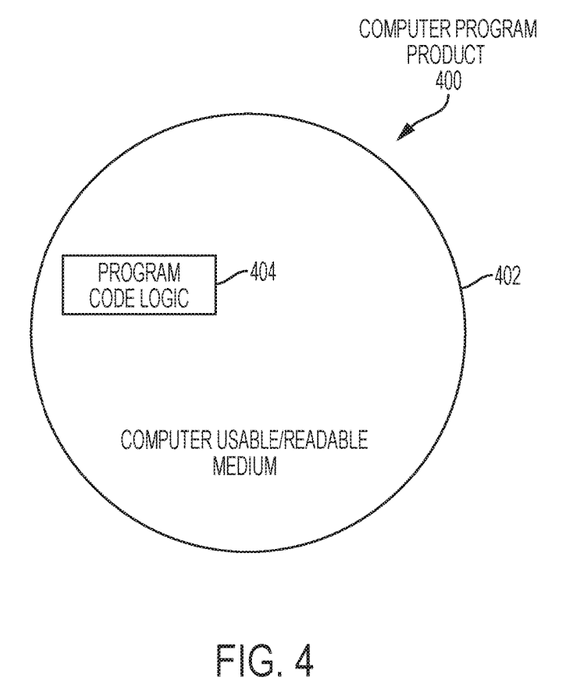
FIG. 4 depicts a diagram of a computer program product according to one or more embodiments.

Referring now to FIG. 4 a computer program product 600 in accordance with an embodiment that includes a computer-readable storage medium 602 and program instructions 604 is generally shown.

Embodiments can be a system, a method, and/or a computer program product. The computer program product can include a computer-readable storage medium (or media) having computer-readable program instructions thereon for causing a processor to carry out aspects of embodiments of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform embodiments of the present invention.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The descriptions presented herein are for purposes of illustration and description, but is not intended to be exhaustive or limited. Many modifications and variations will be apparent to those of ordinary skill in the art without departing from the scope and spirit of embodiments of the invention. The embodiment was chosen and described in order to best explain the principles of operation and the practical application, and to enable others of ordinary skill in the art to understand embodiments of the present invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for creating a public key token, the method comprising:
    receiving, using a processor of a hardware security circuit, a public key and a private key associated with the public key, wherein a master key encrypts the private portion of the public and private key pair;
    receiving, using the processor, a set of permissions that indicate tasks for which the public key and the private key are permitted to be used for the public key and the private key;
    placing, using the processor, the public key and the set of permissions in the public key token;
    creating, using the processor, a message authentication code (MAC) of the public key token; and
    storing, using the processor, the MAC with the public key token to ensure integrity of the public key; wherein
    the set of permissions comprises one or more of the following: digital signature, non-repudiation, key encipherment, data encipherment, key agreement, key certificate signing, certificate revocation signing, encipher only, decipher only.

2. The computer-implemented method of claim 1, wherein:
    the MAC is generated using a derived key, the derived key being generated from the master key.

3. The computer-implemented method of claim 2, further comprising:
    placing a master key verification pattern (MKVP) in the public key token prior to generating the MAC.

4. The computer-implemented method of claim 1, further comprising:

placing information about the public key in the public key token; wherein the information includes, for an RSA public key, fields for the following: reserved, eLength, nBitLength, nByteLength, exponent, modulus.

5. The computer-implemented method of claim 1, further comprising:
placing information about the public key in the public key token; wherein the information includes, for an elliptical cryptography public key, fields for the following: curve-type, reserved, length of curve in bits, length of key in bits, marker because varlen.

6. A computer system for creating a public key token comprising:
a memory; and
a processor system communicatively coupled to the memory;
the processor system of a hardware security circuit configured to perform a method comprising:
receiving a public key and a private key associated with the public key, wherein a master key encrypts the private portion of the public and private key pair;
receiving a set of permissions that indicate tasks for which the public key and private key are permitted to be used for the public key and the private key;
creating a message authentication code (MAC) of the public key token;
storing the MAC with the public key token to ensure integrity of the public key; and
placing the public key and the set of permissions in the public key token; wherein:
the set of permissions comprises one or more of the following: digital signature, non-repudiation, key encipherment, data encipherment, key agreement, key certificate signing, certificate revocation signing, encipher only, decipher only.

7. The computer system of claim 6, wherein:
the MAC is generated using a derived key, the derived key being generated from the master key.

8. The computer system of claim 7, further comprising:
placing a master key verification pattern (MKVP) in the public key token prior to generating the MAC.

9. The computer system of claim 6, further comprising:
placing information about the public key in the public key token; wherein the information includes, for an RSA public key, fields for the following: reserved, eLength, nBitLength, nByteLength, exponent, modulus.

10. The computer system of claim 6, further comprising:
placing information about the public key in the public key token; wherein the information includes, for an elliptical cryptography public key, fields for the following: curve-type, reserved, length of curve in bits, length of key in bits, marker because varlen.

11. A non-transitory computer program product for creating a public key token comprising:
a computer-readable storage medium having program instructions embodied therewith, the program instructions readable by a processor system to cause the processor system of a hardware security circuit to perform a method comprising:
receiving a public key and a private key associated with the public key, wherein a master key encrypts the private portion of the public and private key pair;
receiving a set of permissions that indicate tasks for which the public key and the private key are permitted to be used for the public key and the private key;
placing the public key and the set of permissions in the public key token;
creating a message authentication code (MAC) of the public key token; and
storing the MAC with the public key token to ensure integrity of the public key; wherein:
the set of permissions comprises one or more of the following: digital signature, non-repudiation, key encipherment, data encipherment, key agreement, key certificate signing, certificate revocation signing, encipher only, decipher only.

12. The computer program product of claim 11, wherein:
the MAC is generated using a derived key, the derived key being generated from the master key.

13. The computer program product of claim 12, further comprising:
placing a master key verification pattern (MKVP) in the public key token prior to generating the MAC.

14. The computer program product of claim 11, further comprising:
placing information about the public key in the public key token; wherein the information includes, for an RSA public key, fields for the following: reserved, eLength, nBitLength, nByteLength, exponent, modulus.

15. The computer program product of claim 11, further comprising:
placing information about the public key in the public key token; wherein the information includes, for an elliptical cryptography public key, fields for the following: curve-type, reserved, length of curve in bits, length of key in bits, marker because varlen.

* * * * *